Patented June 10, 1930

1,762,494

UNITED STATES PATENT OFFICE

WILLIAM B. WESCOTT, OF BOSTON, MASSACHUSETTS, ASSIGNOR TO RUBBER LATEX RESEARCH CORPORATION, OF BOSTON, MASSACHUSETTS, A CORPORATION OF MASSACHUSETTS

PROCESS OF TREATING RUBBER LATEX AND PRODUCT THEREOF

No Drawing. Application filed July 8, 1927. Serial No. 204,410.

This invention relates to processes of treating rubber latex and to products thereof; and it comprises a process of mixing rubber latex with a coagulable animal proteid, such as hemoglobin, in definite proportions and drying to a predetermined moisture content without coagulation of the proteid, by means of a spray drying operation, to produce an intimately compounded concentrated rubber-proteid mix, said mixture being sometimes of a fluid consistency and sometimes in the form of a loose non-adhering powder, which may be dispersed in water to yield a dispersion of rubber and proteid substantially like the original rubber latex-proteid solution; all as more fully hereinafter set forth and as claimed.

Latex is the name commonly applied to a juice or sap obtained from rubber trees, particularly, Hevea and it consists of an emulsion or colloid suspension of caoutchouc forming particles and certain non-rubber ingredients in a watery serum. Among these non-rubber components proteids play an important but ill-understood part. Latex is extremely mobile and diffusible, readily entering capillaries, in spite of the relatively large amount of solids, including about 30 per cent of potential caoutchouc. One of the current theories attributes the peculiar properties of the liquid to interfacial concentration of proteid between the caoutchouc particles and the aqueous liquid or serum. Latex is readily coagulated by many and diverse chemical agencies as well as by agitation. When drawn from the rubber trees, latex soon loses its colloidal condition, giving a coagulum or solid mass of rubber, which cannot be redissolved or dispersed in the original serum. Acids and certain substances such as carbon black, lime, asbestos, etc., accelerate the coagulating phenomenon and mechanical agitation also produces the same result. Coagulation will occur upon standing, possibly because of enzymic action or of the formation of acids which exert a coagulating influence.

Certain materials are known to retard or to prevent coagulation, and act as preservatives for the latex. Ammonia is well known and widely used as a protective compound. Materials such as soaps, glue, casein, or the like, which produce solutions having a high surface tension, also tend to inhibit coagulation and their addition to latex has been proposed for this purpose. They are generally not desirable in the rubber made from the latex and in vulcanized rubber they may be quite detrimental because of their hygroscopic nature and solubility in water. Glue, for example, cannot be heat-hardened or set under the circumstances and at the temperatures used in vulcanizing.

Recently, however, it has been discovered (Day, 1,689,581, October 30, 1928) that hemoglobin is a highly desirable protective colloid in latex; and I have found that its presence in vulcanized rubber articles produced from the rubber of such latex is desirable. In these articles, the hemoglobin cures and forms part of the bond. In the present invention, I utilize hemoglobin in producing latex concentrates useful in producing vulcanized rubber articles. In concentration, temperatures sufficient to coagulate the hemoglobin are avoided. Hemoglobin solutions coagulate at about 150° F.

As I have found (see copending application Serial No. 201,207), coagulable proteids can be heat-hardened under conditions analogous to those used in vulcanizing rubber. And I have also found that these coagulable proteids are useful components of vulcanized rubber articles since, under appropriate conditions, they may be set or heat-hardened at temperatures and pressures within the range of those used in vulcanizing rubber. In so doing, exact moisture contents are necessary for the best results; the contents being ordinarily less than the normal water of condition. I have found that the setting of such proteids depends to a large extent upon the moisture present in the material during the curing operation. These proteids in the hardened form have the further advantage of cohesively uniting with vulcanized rubber, as well as with important fillers. Thus, in the case of rubber bonded abrasives, the addition of about 10 per cent hemoglobin to fluid latex furnishing the rubber of the bond, increases the tensile strength about 75 per cent, everything else being equal. The same amount of dry hemoglobin milled into rubber does not appreciably increase the tensile strength, presumably because of the relatively poor dispersion.

Hemoglobin in solution in latex much facilitates concentration without destruction of the characteristic properties of the latex. Using about 5 per cent hemoglobin, the latex may be concentrated to a semi-fluid consistency and still be redispersible. If 10 per cent hemoglobin be employed, the latex may be concentrated still further and it also acquires the property of taking up a large amount of fillers, such as carbon black, which coagulate normal latex, without concurrent coagulation of the rubber during concentration. When 15 per cent or so of hemoglobin is used, the material may, in the presence of a limited or subnormal amount of moisture, be dried to the form of an impalpable powder which may be redispersed in water, and which in its dry form is noncoherent and non-tacky.

I effect concentration by spray drying. If the latex is to be purified by removing non-rubber constituents prior to adding the hemoglobin, this may be done in the apparatus of my Patent No. 1,630,412, May 31, 1927. This apparatus may be used for purifying, concentrating, washing and spraying.

When non-rubber constituents are to be removed and latex serum replaced by a hemoglobin solution, normal latex, usually with a small amount of ammonia, is partially concentrated in the centrifuge and a solution of hemoglobin, usually of about 30 per cent concentration, is admitted to the centrifuge to displace the remaining latex serum. The flow of hemoglobin solution is adjusted until there is a very slight discoloration appearing in the watery effluent and the concentrated liquid containing rubber and hemoglobin is sprayed from the machine under drying conditions. It is important that drying be accomplished at a sufficiently low temperature to avoid coagulation of the proteid.

If a highly concentrated water-dispersable product of a semi-fluid or cheesy consistency is desired, the concentrate should be permitted to flow from the centrifuge at about 60 per cent to 65 per cent rubber concentration and the resulting spray should be air dried to a concentration between 80 per cent and 85 per cent of rubber. These concentrations may be departed from as expediency dictates but, though depending somewhat on the rubber-proteid ratio, there is a marked change in the physical character of the product as the remaining moisture is reduced down from 25 per cent to 10 per cent; the consistency passing from "buttery" through a "cheesy" stage to a solid of substantially normal rubber texture. If normal rubber consistency is desired, the spray drying can be so arranged as to remove all visible moisture with a single drying operation.

The rate of drying possible with a given exposure to drying conditions depends upon the rate of diffusion of the moisture through the proteid and therefore, if the spray particles are large, there is a tendency towards surface drying while the interior of the particles still contains fluid proteid. Under these conditions, the particles may fall as powdery flakes which later however unite into a cheesy mass as moisture diffuses outwardly and softens the dry exterior proteid. It is in general best to control the rate of drying by adjusting the relative humidity of the drying air and by using a spray delivering a very fine mist, so arranging the current of drying air as to turn the mist particles back on themselves before the exterior surface is so dry as to have lost its adhesiveness, so as to form larger particles of partially dried matter. It facilitates collection to have the minute mist particles brought into contact with each other while still moist enough to adhere so that sufficiently large particles are formed to settle out by their own weight.

In the best way of operating as the rubber concentrate leaves the centrifuge, it moves outwardly in a rapidly expanding helix with a high angular velocity (20,000 to 25,000 R. P. M.) into a concentric cylindrical drying chamber. The drying air is admitted slightly above the spray level, tangentially to the chamber wall, at a velocity slightly greater than the peripheral velocity of the spray particles at the chamber wall and in a direction opposite to the angular motion of the particles.

When a semi-fluid concentrate of a buttery to cheesy consistency is desired, the relative humidity of the drying air and the other variables affecting desiccation are so adjusted that the end product contains about 80 per cent to 85 per cent solids. The range of the semi-fluid concentrate may be extended to products containing much more moisture but, as this is usually of no advantage, concentration should be carried to yield a semi-fluid having not less than 75 per cent nor more than 85 per cent solids.

Such a semi-fluid concentrate is freely dispersible in water, preferably slightly alkaline. And the resulting dispersion is substantially like the original mixture of latex and proteid. There is little, if any, increase in the number of globule aggregates or flocculent coagula, such as constitute the "cream" sometimes found in commercial preserved latex. Such a semi-fluid concentrate should be kept weakly alkaline and because of the presence of water and proteid should contain some antiseptic. Sodium fluorid is best.

The amount of proteid required for effective protection of latex against coagulation by the types of filler which coagulate ordinary latex such as carbon black, asbestos fiber, comminuted rubber, et cetera, varies with each proteid substance. Hemoglobin, egg albumen and serum albumen have greater protective effects per unit of proteid than any of the other proteids investigated. Serum albumen, as a simple proteid, is not commercially available, and, when used together with blood serum globulin, as it occurs in serum, is less effective than substantially pure hemoglobin, as produced by the process described in my pending application, Serial No. 605,090, filed December 5, 1922. Such hemoglobin as a fluid or dry soluble powder is now commercially available.

The color of hemoglobin may be lightened or reduced to a light yellow by known methods when this is deemed desirable. In general, however, in making such concentrates I prefer to use substantially pure liquid hemoglobin of about 30 per cent concentration, as obtained from centrifugal treatment of blood at the slaughterhouse. I usually add 10 per cent of sodium fluorid, (taken on the solid hemoglobin), as a protective. Dry soluble hemoglobin, or more properly methemoglobin, may be dissolved in water or in a solution of sodium fluorid and used with equally good results. For the present purposes, 10 per cent of hemoglobin on the rubber content of the latex is ample.

The particular proteid-rubber ratio used depends upon the objective in view. If the proteid is added as a compounding ingredient only, the amount may be as low as 5 per cent. When a latex-proteid mixture, containing as little as 5 per cent proteid, is dried, the product is of rubbery texture and is not dispersible in water. If, on the other hand, the drying is stopped while the proteid is still fluid and the mass is of buttery consistency, it is disperisble in water but is so sensitive to mechanical agitation that, if coagulation is to be avoided, the dispersion must be accomplished by allowing the added water to diffuse through the proteid solution, in which the rubber latex globules are suspended, without stirring, until the water content of the whole has risen to at least 40 per cent.

With small further increments of proteid, the mixture becomes rapidly more stable. As the moisture content is reduced towards "dryness" however, a point is reached with a limited amount of proteid when the proteid solution ceases to be the continuous phase and becomes a dispersed phase in the resultant rubber gel, and the material is no longer dispersible in water.

When operating with limited amounts of proteid, that is, less than 10 per cent of hemoglobin, it will be seen that a dispersible concentrate cannot be obtained if the water is removed beyond a certain degree. Furthermore, if such a material is dried so as to contain no apparent aqueous phase the material so formed is tacky and has many of the properties of an ordinary gel. If tackiness is to be avoided, thus permitting the dried material to remain in the form of a powder, more proteid must be present, and if dispersion is also desired in the dried product, then the moisture content must be carefully controlled to an extent depending upon the nature and concentration of the protective colloid. It may be reduced to less than the normal water of condition.

In speaking hereinafter of the stated "reduced" moisture content, it is to be understood that I refer to an amount of moisture present in the proteid or dried material less than that normally present in balance with atmospheric conditions. In other words, the "water of condition", the amount of water normally present by virtue of a condition of equilibrium between the material and the humidity of the air, is sub-normal. Limited water of condition, or sub-normal moisture, may be obtained by drying in an atmosphere of air at an air temperature of about 140° to 160° F. and having a relative humidity of 10 per cent. The absolute amount of moisture present in the air under these conditions, and hence the amount present in the dried material, is less than that which is obtainable when drying in any ordinary climate. As set forth more fully in my stated co-pending application, Serial No. 201,207, the measure of the moisture content on a scale in which zero is the drying obtained at 140–150 F. and 10 per cent humidity, is arbitrary, but as such conditions are reproducible and can be obtained with commonly used types of apparatus or air conditioners, the employment of this arbitrary scale is practically advantageous.

In order that the proteid may remain as the continuous phase and thereby prevent the formation of a rubber gel, it is best to use from 10 per cent to 15 per cent hemoglobin and to carry desiccation just short of the point where the proteid solution becomes solid, the material remaining semi-fluid. The moisture required to maintain this semi-fluid state depends on the proteid. The viscosity of hemoglobin, in high concentrations, is less than that of any other animal proteid and is, therefore, advantageous for this reason, as well as for the other reasons stated. The most advantageous amount of added proteid is indicated by the use to which the rubber is to be put. Thus, if the end product is to be an ebonite, or hard rubber, 15 per cent to 25 per cent proteid, or even more, may be desirable. In bonding asbestos fiber to make a hard dense marble-like material, suitable for electrical switchboard panels, I have found that as much as 30 per cent hemoglobin on the rubber can be used advantageously. With such a 70 per cent and 30 per cent rubber-proteid mix, and with short asbestos fiber averaging one-quarter inch in length, I found that I could obtain tensile strengths of 3500 to 4000 pounds per square inch by bonding with as little as 6 per cent rubber-proteid-sulfur; while with but just enough hemoglobin to prevent coagulation of the latex by the asbestos, i. e. 5 per cent hemoglobin, 11 per cent of bond was required to give the same tensile strength, everything else being equal. For most purposes however, 10 per cent to 15 per cent added hemoglobin is sufficient and, if the end product is to be but lightly vulcanized, it may be less. Thus, 5 per cent hemoglobin will permit the addition of 25 per cent of carbon black without coagulation of the latex. With 10 per cent hemoglobin, diluted latex will take up, without coagulation, as much as 200 per cent of carbon black, which is more than can be satisfactorily held by the rubber in the final article. Other finely divided fillers may be added to the latex before drying; but, if the centrifuge is used as a source of spray for spray drying, then only such fillers can be used as will not be centrifugally separated from the rubber containing fraction.

In general, the mixture of latex and proteid is dried to obtain a water dispersible end product, which may be, as stated, a semifluid buttery to cheesy mass. Or it may be so dried as to yield a fine powder of proteid coated caoutchouc that is also dispersible.

I have discovered that by producing a very fine mist, and drying to less than normal water of condition, while the mist is still suspended in the drying air, I can obtain a non-adhering or loose proteid coated rubber dust, freely dispersible in water and of excellent keeping qualities. Being a powder it can be readily mixed with dry fillers, sulfur, etc., and the mix directly cured under heat and pressure to give such articles as may be wanted. With a limited amount of proteid the powder is sensitive to pressure; possibly because of proteid films breaking down and allowing still liquid rubber particles to flow.

In producing such a powdery dry product, I find it advantageous to use about 15 per cent hemoglobin (on the rubber content of the latex) and to dry, without coagulation of the proteid, to less than the normal water of condition of the proteid. This I accomplish by drying a very finely divided spray, while admitting the entering air at 150° F. to 160° F. with 8 per cent to 10 per cent relative humidity and so adjusting the volume of air to the volume of centrifugal effluent that the air leaving the chamber, after absorbing moisture from the spray, is of about 20 per cent to 22 per cent relative humidity. In this case, however, I find it advantageous to introduce a tangential stream of drying air in the same direction as the spray. I thus avoid building up large particles, as is done if the end product is to be semi-fluid or an indispersible solid, but is undesirable in the production of a fine powder.

In order to obtain a spray sufficiently fine for the production of an impalpable powder, I sometimes find it advantageous to omit concentration in the centrifugal by closing the serum outlet of the centrifuge, using the latter solely as a spray producing means. In this case I usually add the proteid in solution so as to dilute the latex to about 25 per cent total solids, thus decreasing the viscosity so that the effluent may break up into an extremely fine mist; and I find it generally unnecessary to use an antiseptic.

When producing such a fine powder, I find it usually necessary to use some sort of dust collector which may be of the centrifugal screen type, or merely an additional cylindrical chamber with tangential air inlet and central outlet and with a conical bottom hopper; the whole being in series with the primary drying chamber.

When drying to a powder, it is important that the particle size be kept small and that the total moisture content in the dried collected material be so low that, when equilibrium between the interior and the exterior of the particle is reached, the exterior proteid shall be quite free of tackiness. If the particles, though superficially dry, contain an excess of moisture, an amount of water, for example, equal to the normal water of condition, the surface becomes tacky when interior moisture diffuses to the outside and the whole mass will cohere and be of a spongy consistency. Under such conditions and before cohesion has occurred, the moisture content of the powdery mass may be adjusted by suitable drying means but it is better to obtain the optimum dryness or limited content of water of condition in the first instance. In any event, the exposure of the powder to the atmosphere should be avoided in shipment and storage, as the water of condition would increase by equilibrium with the atmosphere beyond the optimum.

In obtaining a dispersion of rubber in water from such a rubber-proteid powder, I find it expedient to add 1 per cent to 2 per cent of ammonia solution and gently pour the requisite amount of this ammoniacal water over the powder in a shallow container; allowing the whole to stand, at room temperature, without stirring, for at least two hours. It is obvious that this time will be shorter or longer as the powdery layer is thin or thick. The mass should not be stirred until the water has thoroughly diffused through the powder. When all of the powder is sufficiently wet, more water may be gently stirred in as desired, but violent mechanical agitation should be avoided.

The degree of dispersion obtainable from such a powder is suprising. While the rubber is naturally not in as fine a state of diffusion as in normal fresh latex, or as in the dispersion obtained from the buttery or cheesy semifluid concentrate, it, nevertheless, closely approximates in aggregate size those globule aggregates composing the "cream" of commercially preserved latex, and is therefore useful in many industrial applications.

Whatever the character or consistency of the end product desired, the latex may be prevulcanized in known ways and this is, in general, best done before adding the proteid, complete vulcanization, including cure of the proteid, being accomplished subsequently.

It will be noted that, whereas prior attempts at concentrating fluid latex with a protective colloid have been limited to the provision of a concentrate containing an appreciable amount of water if the dispersibility was to be retained, and have resulted in tacky and non-dispersible rubber masses if the concentration was carried to dryness, I am enabled, by practicing my invention, to obtain a non-tacky powder of unvulcanized rubber by controlling the moisture content during the drying operation, and, by providing a definite amount of proteid during such drying, to preserve the dispersibility even in the powder. By using a proteid such as hemoglobin, which may be heat hardened, I am able to produce a final vulcanized product that is not adversely affected by the inclusion of a protective colloid.

In the present invention the action of the emulsion-aiding natural proteid of the latex is supplemented by that of added hemoglobin in definite amount. In drying or evaporation, desiccating conditions are carefully controlled to avoid local overdrying or under drying, and to give a product of uniform moisture content. In the case of hemoglobin and latex dried to a sub-normal moisture content, the composition under vulcanizing conditions can be hardened as a whole to give a particularly advantageous bonding material for various purposes.

What I claim is:

1. A method of preparing dispersible rubber concentrates from rubber latex which comprises adding hemoglobin to the latex and spray drying the resulting mixture of latex and protective colloid in contact with air containing a known moisture content.

2. A method of preparing dispersible rubber concentrates from rubber latex which comprises adding hemoglobin in known proportions to the latex and removing from the resulting mixture an amount of water depending upon the proportion of hemoglobin added.

3. A method of preparing dispersible rubber concentrates from rubber latex which comprises adding hemoglobin in known proportions to the latex and spray drying the resulting mixture in the presence of air of known moisture content.

4. A process of producing a powder of non-tacky rubber particles which comprises admixing hemoglobin with rubber latex, the amount of hemoglobin being at least sufficient to produce a non-tacky rubber, and spraying the said mixture into an atmosphere of warm air of controlled, predetermined moisture content, the said mixture being exposed to said atmosphere for a period of time sufficient to produce a powder of non-tacky rubber particles of a uniform moisture content.

5. A process of producing a powder of non-tacky rubber particles which comprises admixing hemoglobin with rubber latex, the amount of hemoglobin being at least sufficient to produce a non-tacky rubber, and spraying the said mixture into an atmosphere of warm air of controlled predetermined moisture content, the temperature of said air being insufficient to effect coagulation of the hemoglobin, and the temperature and moisture content of said air being controlled to prevent a skin drying effect, the said mixture being exposed to said atmosphere for a sufficient time to produce a powder of non-tacky rubber particles of uniform moisture content.

6. A powder composed of non-tacky rubber particles containing hemoglobin having a subnormal moisture content, the said powder being stable when stored and being redispersible in water to form a rubber latex.

In testimony whereof, I have hereunto affixed my signature.

WILLIAM B. WESCOTT.